United States Patent

Grant

[11] Patent Number: 6,135,124
[45] Date of Patent: Oct. 24, 2000

[54] HAIR EXTENSION TOOL

[76] Inventor: Ernestine Grant, 1074 Lafayette Ave., Brooklyn, N.Y. 11221

[21] Appl. No.: 09/515,161

[22] Filed: Feb. 29, 2000

Related U.S. Application Data

[60] Provisional application No. 60/123,311, Mar. 5, 1999.

[51] Int. Cl.[7] .................................................. A45D 26/00
[52] U.S. Cl. ............................ 132/271; 132/201; 219/223
[58] Field of Search .................................... 132/271, 224, 132/201; 219/223, 225; 30/140

[56] References Cited

U.S. PATENT DOCUMENTS

| | | | |
|---|---|---|---|
| 4,662,068 | 5/1987 | Polonsky | 30/140 |
| 5,472,654 | 12/1995 | Crawford | 132/201 |
| 5,769,100 | 6/1998 | Alexander | 132/271 |
| 5,783,800 | 7/1998 | Thompson et al. | 132/201 |
| 5,894,846 | 4/1999 | Gang | 132/201 |

*Primary Examiner*—Todd E. Manahan
*Attorney, Agent, or Firm*—Goldstein & Canino

[57] ABSTRACT

A hair extension tool includes a pair of elongated handles pivotally secured together at upper ends thereof. The upper ends of the pair of handles have arcuate clamps disposed thereon. A pair of metal rollers are secured to outer surfaces of upper ends of the arcuate clamps of the handles. A pair of heating elements are secured on inner surfaces of the upper ends of the arcuate clamps of the handle. A pair of cutting blades are secured to and extend inwardly from curved central portions of the arcuate clamps of the handle.

4 Claims, 2 Drawing Sheets

HAIR EXTENSION TOOL

CROSS REFERENCES AND RELATED SUBJECT MATTER

This application relates to subject matter contained in provisional patent application Ser. No. 60/123,311, filed in the United States Patent & Trademark Office on Mar. 5, 1999.

BACKGROUND OF THE INVENTION

The present invention relates to a hair extension tool and more particularly pertains to holding a braid in place while it is simultaneously sealed and cut.

It is quite common for a person to supplement their own natural hair with strands of synthetic fiber formed to look like human hair. These synthetic fibers are braided into the natural hair for a gradual transition from the one to the other. In this fashion, the person can effectively increase their hair length so as to partake in many more hair styles. Braiding synthetic hair involves the process of cutting the finders and then burning or singeing these newly cut ends to prevent the synthetic strands from unraveling. Generally, this is accomplished by using scissors and a cigarette lighter, involving the constant switching between the two implements while simultaneously attempting to maintain a firm grasp on the braided fibers. The present invention seeks to provide a solution to these problems by providing a single implement that can perform all of these tasks.

The use of hair accessories is known in the prior art. More specifically, hair accessories heretofore devised and utilized for the purpose of heat sealing braids are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,472,654 to Crawford discloses a tool used to cut a synthetic material, such as braided synthetic hair fibers, and singe the end to prevent unraveling. U.S. Pat. No. 4,982,748 to Trimarchi discloses a tool for using heat to seal a braid of hair. U.S. Pat. No. 5,064,993 to Hashimoto discloses an electric device for treating hair.

While these devices fulfill their respective, particular objective and requirements, the aforementioned patents do not describe a hair extension tool for holding a braid in place while it is simultaneously sealed and cut.

In this respect, the hair extension tool according to the present invention substantially departs from the conventional concepts and designs of the prior art, and in doing so provides an apparatus primarily developed for the purpose of holding a braid in place while it is simultaneously sealed and cut.

Therefore, it can be appreciated that there exists a continuing need for new and improved hair extension tool which can be used for holding a braid in place while it is simultaneously sealed and cut. In this regard, the present invention substantially fulfills this need.

SUMMARY OF THE INVENTION

In the view of the foregoing disadvantages inherent in the known types of hair accessories now present in the prior art, the present invention provides an improved hair extension tool. As such, the general purpose of the present invention, which will be described subsequently in greater detail, is to provide a new and improved hair extension tool and method which has all the advantages of the prior art and none of the disadvantages.

To attain this, the present invention essentially comprises a pair of elongated handles pivotally secured together at upper ends thereof. The upper ends of the pair of handles have arcuate clamps disposed thereon. The pair of elongated handles have a spring member secured therebetween. The spring member biases the arcuate clamps away from one another. A pair of metal rollers are secured to outer surfaces of upper ends of the arcuate clamps of the handles. A pair of heating elements are secured on inner surfaces of the upper ends of the arcuate clamps of the handle. The heating elements have a power cord extending outwardly of a lower end of one of the handles. The power cord is couplable to an electrical outlet. A pair of cutting blades are secured to an extend inwardly from curved central portions of the arcuate clamps of the handle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hair extension tool which has all the advantages of the prior art hair accessories and none of the disadvantages.

It is another object of the present invention to provide a new and improved hair extension tool which may be easily and efficiently manufactured and marketed.

It is a further object of the present invention to provide a new and improved hair extension tool which is of durable and reliable construction.

An even further object of the present invention is to provide a new and improved hair extension tool which is susceptible of a low cost of manufacture with regard to both materials and labor, and which accordingly is then susceptible of low prices of sale to the consuming public, thereby making such a hair extension tool economically available to the buying public.

Even still another object of the present invention is to provide a new and improved hair extension tool for holding a braid in place while it is simultaneously sealed and cut.

Lastly, it is an object of the present invention to provide a new and improved hair extension tool including a pair of elongated handles pivotally secured together at upper ends thereof. The upper ends of the pair of handles have arcuate clamps disposed thereon. A pair of metal rollers are secured to outer surfaces of upper ends of the arcuate clamps of the handles. A pair of heating elements are secured on inner surfaces of the upper ends of the arcuate clamps of the handle. A pair of cutting blades are secured to an extend inwardly from curved central portions of the arcuate clamps of the handle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
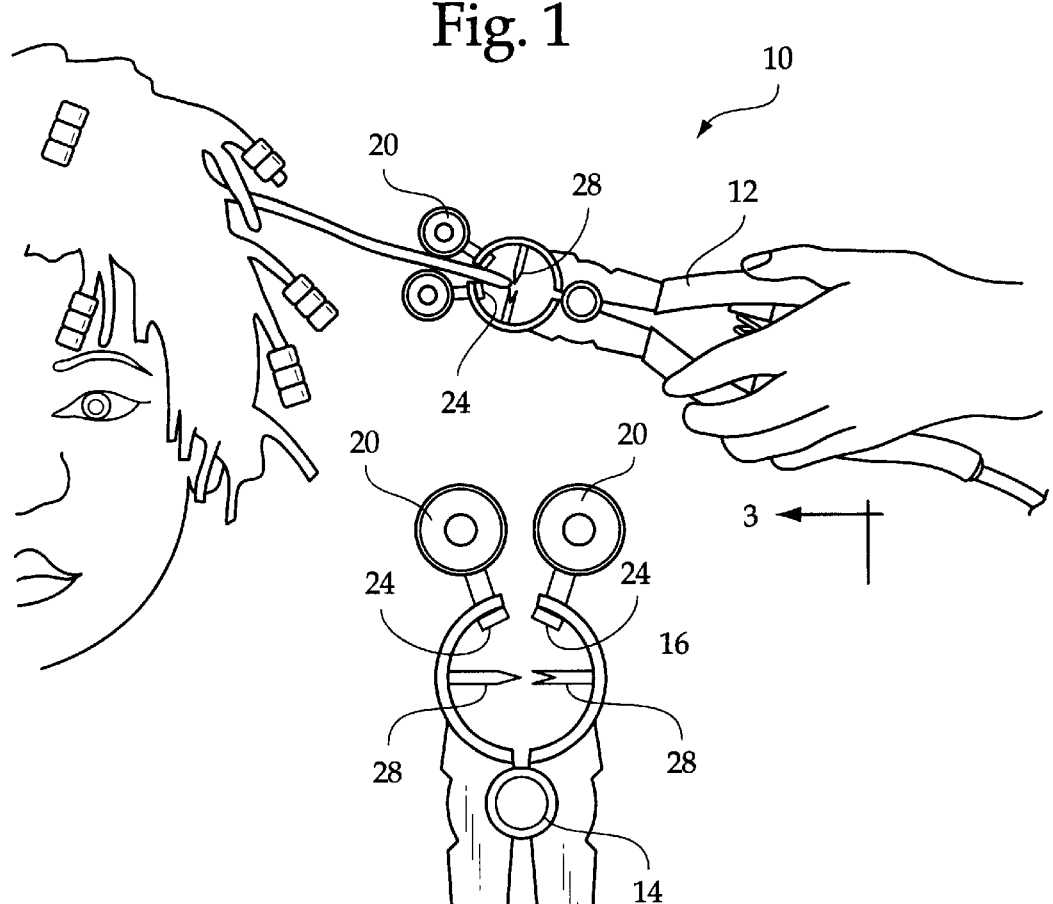
FIG. 1 is a side view of the preferred embodiment of the hair extension tool constructed in accordance with the principles of the present invention.
Figure 2:
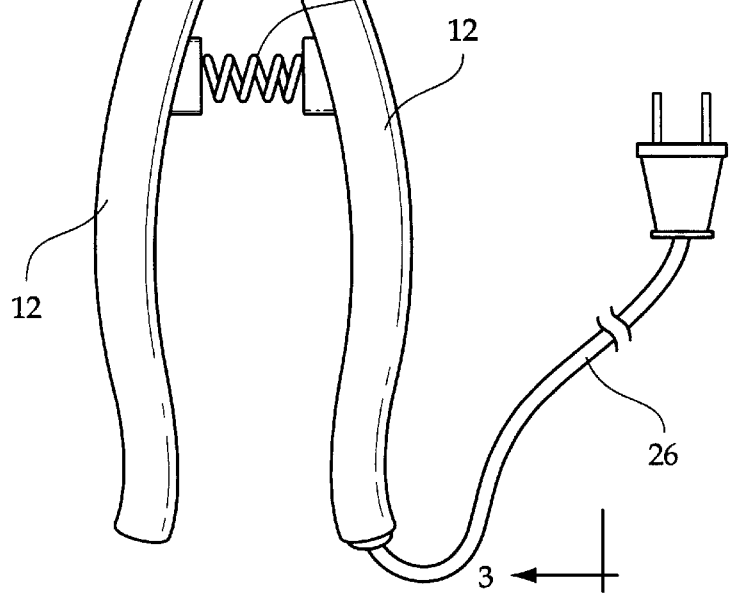
FIG. 2 is a top plan view of the present invention.
Figure 3:
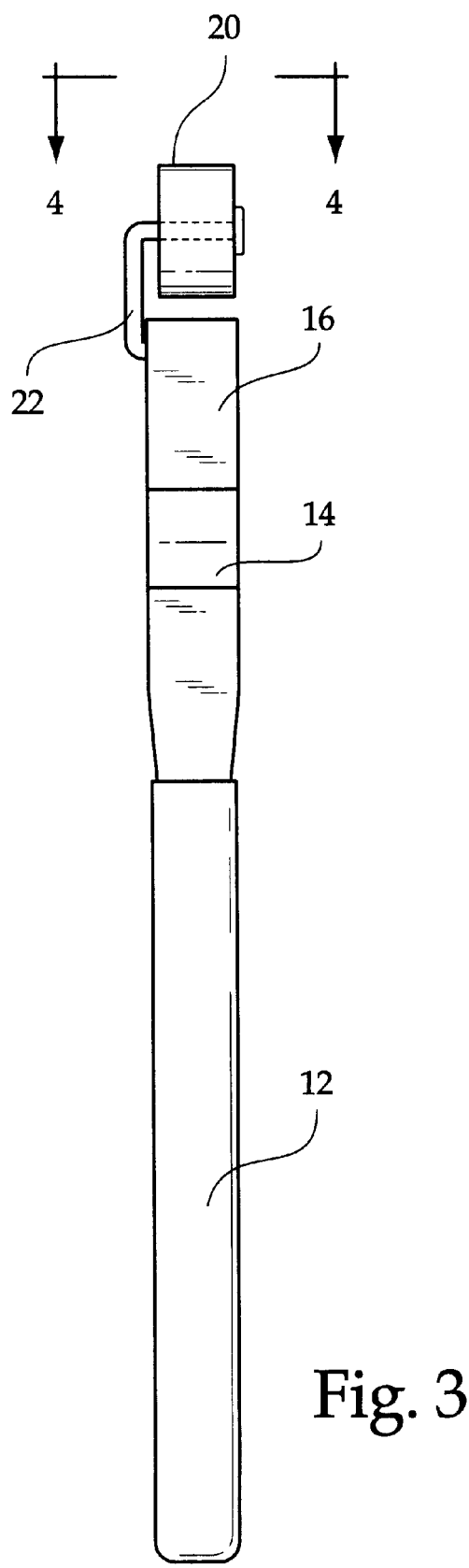
FIG. 3 is a side view of the present invention as taken along line 3–3 of FIG. 2.
Figure 4:
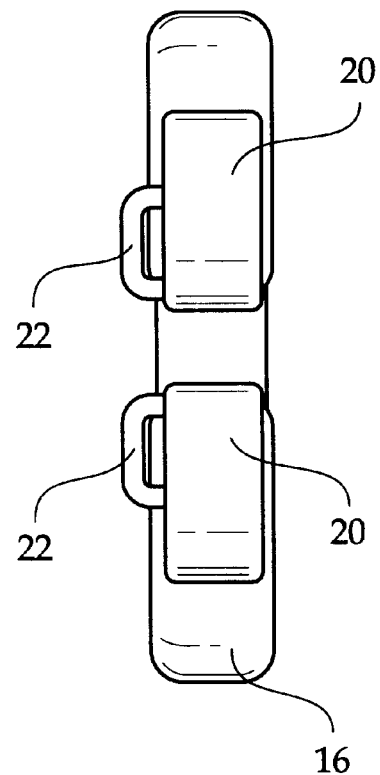
FIG. 4 is an end view of the present invention as taken along line 4–4 of FIG. 3.

With reference now to the drawings, and in particular, to FIGS. 1 through 4 thereof, the preferred embodiment of the new and improved hair extension tool embodying the principles and concepts of the present invention and generally designated by the reference number 10 will be described.

Specifically, it will be noted in the various Figures that the device relates to a hair extension tool for holding a braid in place while it is simultaneously sealed and cut. In its broadest context, the device consists of a pair of elongated handles, a pair of metal rollers, a pair of heating elements, and a pair of cutting blades. Such components are individually configured and correlated with respect to each other so as to attain the desired objective.

The pair of elongated handles 12 are pivotally secured together at upper ends thereof. A pivot pin 14 facilitates the pivotal coupling of the handles 12. The upper ends of the pair of handles 12 have arcuate clamps 16 disposed thereon. The pair of elongated handles 12 have a spring member 18 secured therebetween. The spring member 18 biases the arcuate clamps 16 away from one another.

The pair of metal rollers 20 are secured to outer surfaces of upper ends of the arcuate clamps 16 of the handles 12. The rollers 20 are secured to the arcuate clamps 16 through the use of C-shaped clamps 22 which extend the rollers 20 to a position above the arcuate clamps 16. The rollers 20 serve as gripping members for securely holding an extension and a person's hair together. Note FIG. 1.

The pair of heating elements 24 are secured on inner surfaces of the upper ends of the arcuate clamps 16 of the handle 12. The heating elements 24 have a power cord 26 extending outwardly of a lower end of one of the handles 12. The power cord 26 is couplable to an electrical outlet. The heating elements 24 will seal the extension to the person's hair.

The pair of cutting blades 28 are secured to an extend inwardly from curved central portions of the arcuate clamps 16 of the handle 12. The cutting blades 28 cut the end off of the extension after it has been sealed to the person's hair.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by letters patent of the united states is as follows:

1. A hair extension tool for holding a braid in place while it is simultaneously sealed and cut comprising, in combination:

a pair of elongated handles pivotally secured together at upper ends thereof, the upper ends of the pair of handles having arcuate clamps disposed thereon, the pair of elongated handles having a spring member secured therebetween, the spring member biasing the arcuate clamps away from one another;

a pair of metal rollers secured to outer surfaces of upper ends of the arcuate clamps of the handles;

a pair of heating elements secured on inner surfaces of the upper ends of the arcuate clamps of the handle, the heating elements having a power cord extending outwardly of a lower end of one of the handles, the power cord being couplable to an electrical outlet;

a pair of cutting blades secured to and extending inwardly from curved central portions of the arcuate clamps of the handle.

2. A hair extension tool for holding a braid in place while it is simultaneously sealed and cut comprising, in combination:

a pair of elongated handles pivotally secured together at upper ends thereof, the upper ends of the pair of handles having arcuate clamps disposed thereon;

a pair of metal rollers secured to outer surfaces of upper ends of the arcuate clamps of the handles;

a pair of heating elements secured on inner surfaces of the upper ends of the arcuate clamps of the handle;

a pair of cutting blades secured to and extending inwardly from curved central portions of the arcuate clamps of the handle.

3. The hair extension tool as set forth in claim 2 wherein the pair of elongated handles have a spring member secured therebetween, the spring member biasing the arcuate clamps away from one another.

4. The hair extension tool as set forth in claim 2 wherein the heating elements have a power cord extending outwardly of a lower end of one of the handles, the power cord being couplable to an electrical outlet.

* * * * *